Figure 1:
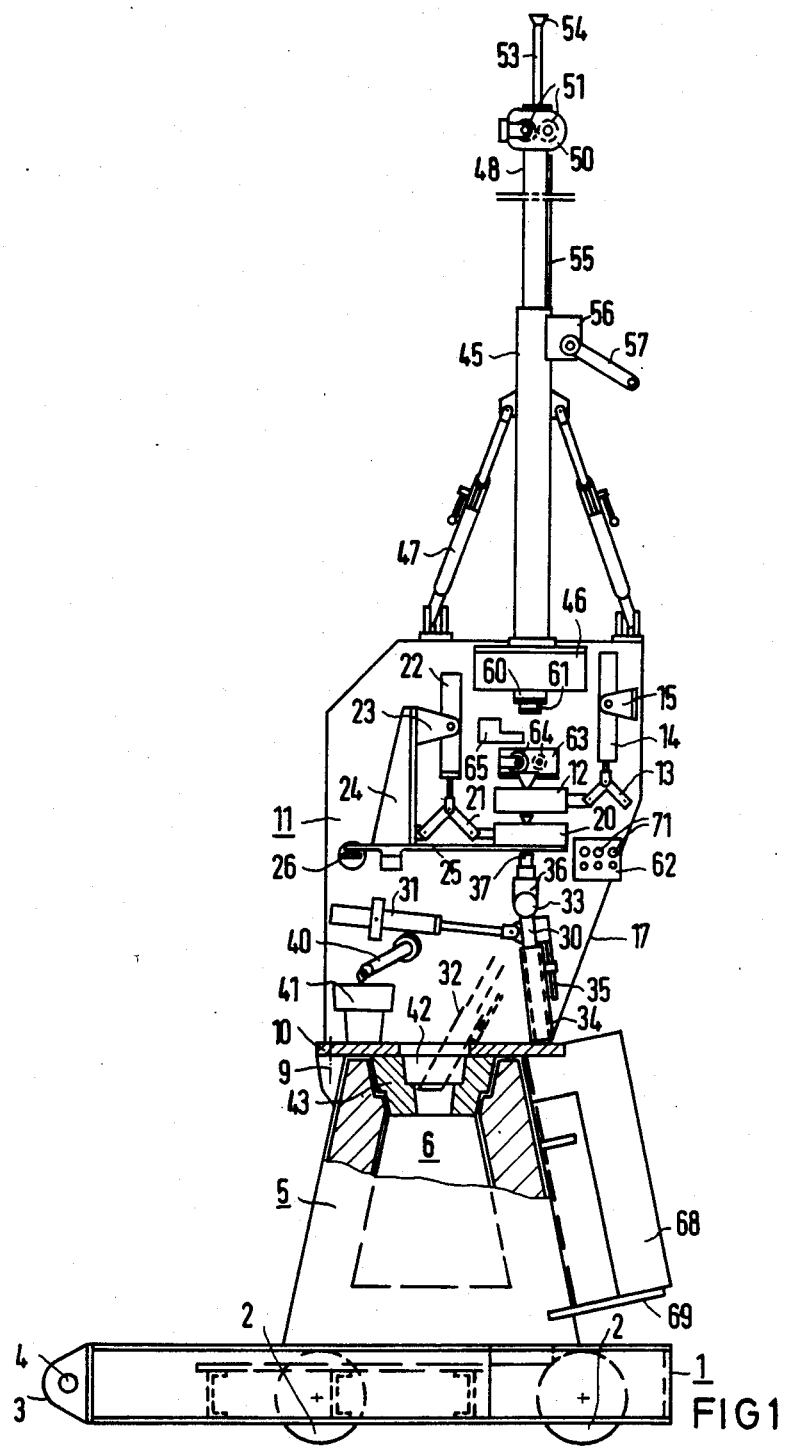

United States Patent [19]

Kiewitz et al.

[11] Patent Number: 4,664,872
[45] Date of Patent: May 12, 1987

[54] DEVICE FOR DISPOSING OF ELONGATED CORE INSTRUMENTATION PROBES FROM NUCLEAR REACTORS

[75] Inventors: Hans-Christoph Kiewitz, Bad Vilbel; Armin Dietsch, Offenbach; Manfred Tennie, Grossostheim, all of Fed. Rep. of Germany

[73] Assignee: Kraftwerk Union Aktiengesellschaft, Mülheim, Fed. Rep. of Germany

[21] Appl. No.: 570,831

[22] Filed: Jan. 16, 1984

[30] Foreign Application Priority Data

Jan. 20, 1983 [DE] Fed. Rep. of Germany ....... 3301814

[51] Int. Cl.⁴ .................... G21C 19/00; B07C 5/00
[52] U.S. Cl. .................. 376/260; 376/245; 376/272; 209/576; 83/925 R; 414/146
[58] Field of Search ............ 376/260, 463, 272, 261, 376/264, 267, 245; 252/626; 209/576; 83/580, 925 R; 414/146

[56] References Cited

U.S. PATENT DOCUMENTS

| | | | |
|---|---|---|---|
| 2,707,555 | 5/1955 | Gaudin | 376/157 X |
| 3,672,247 | 6/1972 | Cherel | 83/580 X |
| 4,095,495 | 6/1978 | Chaze et al. | 83/925 R X |
| 4,186,657 | 2/1980 | Weil et al. | 83/580 X |
| 4,194,634 | 3/1980 | Kelly | 209/576 X |
| 4,211,132 | 7/1980 | Nichols, III et al. | 209/576 X |
| 4,377,551 | 3/1983 | Adams | 252/657 X |
| 4,394,907 | 7/1983 | Bohme et al. | 209/576 X |
| 4,510,832 | 4/1985 | Guilloteau | 83/925 R X |

OTHER PUBLICATIONS

"Patent Awarded for Palisades Chopper", Nuclear Engr. Int., Sep. 1982, pp. 52-53.

Primary Examiner—Deborah L. Kyle
Assistant Examiner—Dan Wasil
Attorney, Agent, or Firm—Herbert L. Lerner; Laurence A. Greenberg

[57] ABSTRACT

Device for disposing of elongated core instrumentation probes from nuclear reactors, the device having a guide for the probes to be disposed of, shears for cutting the elongated probes into sections and a shroud for receiving the sections, including a shielded storage container, the guide including a switch for bypassing the shroud, and means for controlling the switch together with the shears for directing relatively long probe sections having a relatively low radiation level into the shroud, and for cutting probe parts having a relatively high radiation level into manifold shorter sections and guiding the manifold shorter sections of the probes having the relatively high radiation level into the storage container.

7 Claims, 2 Drawing Figures

DEVICE FOR DISPOSING OF ELONGATED CORE INSTRUMENTATION PROBES FROM NUCLEAR REACTORS

The invention relates to a device for disposing of elongated core instrumentation probes, such as radiation detectors, especially from nuclear reactors, the device including a guide for the probes to be disposed of, shears for cutting them into sections and a shroud for receiving the sections.

Such a device is known from the journal "Nuclear Engineering International", September 1982, pages 52 and 53. In this connection it is noted that the very small uniform size of the sections permits denser packing so that, contrary to before, only a single container is yet necessary. A reduction in the volume of the radioactive waste is thereby supposed to be achieved, and correspondingly lower shipping and storage costs.

It is accordingly an object of the invention to provide an improved device for removing elongated core instrumentation probes whereby especially labor and shielding costs are even further reduced.

With the foregoing and other objects in view, there is provided, in accordance with the invention, a device for disposing of elongated core instrumentation probes from nuclear reactors, the device having a guide for the probes to be disposed of, shears for cutting the elongated probes into sections and a shroud for receiving the sections, comprising a shielded storage container, the guide including a switch for bypassing the shroud, and means for controlling the switch together with the shears for directing relatively long probe sections having a relatively low radiation level into the shroud, and for cutting probe parts having a relatively high radiation level into manifold shorter sections and guiding the manifold shorter sections of the probes having the relatively high radiation level into the storage container.

Briefly stated, the comminution of the nuclear instrumentation probes, in accordance with the invention, varies in accordance with the radiation. Parts which do not radiate at all or which do so only slightly, are delivered with a relatively greater length into the shroud or quiver. Highly activated parts, which must be treated specially from a radiation point of view, are then divided into much smaller sections, It is therefore possible to fill a shielding container therewith with relatively good space utilization. The parts which radiate only slightly or not at all, can on the other hand, be transported and, if possible, removed without special shielding. This results in considerable cost savings for the reason that, contrary to the state of the art, not all of the sections of the probes are delivered into a singly container.

In accordance with another feature of the invention, the switch and the shears are controlled to particular advantage by a radiation-measuring device which "sorts" the parts which are to be removed directly. In the case of a known activity distribution, however, the parts for the shroud and for the shielded container can be selected also in accordance with the length thereof.

In accordance with a further feature of the invention, two pairs of shears are provided for the different section lengths and are then made operative alternatively, for example, by the radiation measuring device. In any event, according to an added feature of the invention, the lengths of the respective sections differ by at least a factor of 10, indeed, also in the case wherein the invention is realized with only a single pair of shears.

In accordance with an additional feature of the invention, the shears are associated with the guide which includes a telescopic tube with which the positions of the detectors are the reactor can easily be approached. To this end, the guide tube is additionally constructed so as to be tiltable or pivotal, preferably with a ball or universal joint.

In accordance with yet another feature of the invention, a respective drive device is located at both ends of the guide tube. This permits the shears to be loaded uniformly and avoids manual operation to any major extent, as is explained hereinafter in further detail. The drive device at the shears is preferably torque-controlled. The other drive device, on the other hand, is connectible to a transmitter at the end of the guide tube facing towards the shears. The one drive device can thereby be shut down if the nuclear instrumentation probe has reached the end of the guide tube, and the second drive device can then become operative.

In accordance with yet additional features of the invention the drive device, the scissors and the switch are arranged on a plate; the plate is mounted on the shielded storage container; and the storage container supports the shroud and is mounted on a transport frame. The shielded storage container with its very great weight forms the base for the construction of the devices required for comminuting the probe parts. The transport frame serves for moving the device into the operating position thereof. To this end, it is advantageously constructed as a rolling unit.

In accordance with a concommittant feature of the invention, the plate has a support frame for the shears and the switch. The telescope tube is releasably or detachably fastened to the support frame, so that the height required for transporting the device is advantageously low.

Other features which are considered as characteristic for the invention are set forth in the appended claims.

Although the invention is illustrated and described herein as embodied in a device for disposing of elongated core instrumentation probes form nuclear reactors, it is nevertheless not intended to be limited to the details shown, since various modifications and structural changes may be made therein without departing from the spirit of the invention and within the scope and range of equivalents of the claims.

Figure 2:
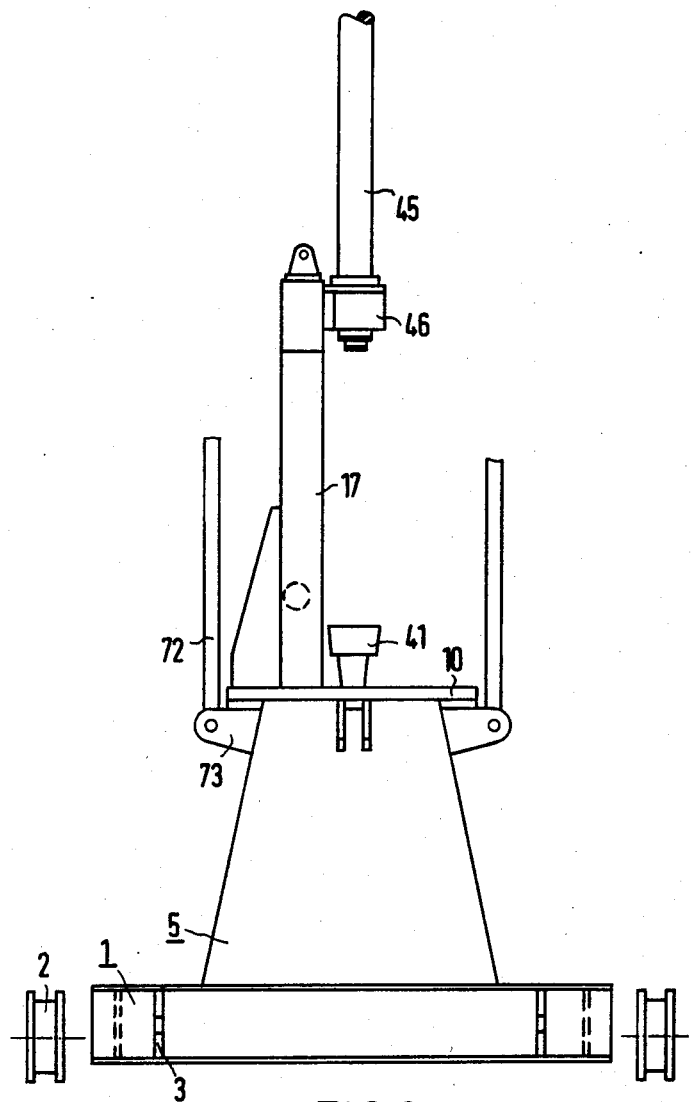

The construction and method of operation of the invention, however, together with additional objects and advantages thereof will be best understood from the following description of specific embodiments when read in connection with the accompanying drawings, in which:

FIG. 1 is a partly diagrammatic, partly in section, and partly broken away front elevational view of the device for disposing of elongated core instrumentation probes from nuclear reactors according to the invention; and FIG. 2 is a fragmentary side elevational view of FIG. 1.

Referring now to the drawing and first, particularly, to FIG. 1 thereof, there is shown a transport frame 1 which is assembled from sheetmetal beams and is equipped with wheels 2. At one end face of the transport frame 3, buffer eyes 3 with holes 4 formed therein are provided, by which the support frame 1 can be coupled to an assembly machine. On the transport frame 1, there is mounted a storage container 5 having the shape of a truncated cone, as seen in FIG. 1. The container 5 is formed with wall thicknesses of 150 mm of shielding material, such as lead, for example, so that the interior 6 thereof which has a volume of 15–30×10³ cm³, for example, can also contain more intensively radiating substances.

On the storage container 5, there rests a plate 10 which is fastened by screws 9 thereto. The plate 10 forms a separation between the storage container 5 and a cutting unit which is disposed thereabove and is identified as a whole by reference numeral 11. The cutting unit 11 includes a first pair of shear 12 actuated via a toggle lever 13 by an electric solenoid 14. The electric solenoid 14, which could also be replaced by a pressure medium drive, is fastened by means of a pillow or bearing block 15 to a support frame 17 which extends vertically upwardly from the horizontal plate 10.

Below the scissors 12, a second set of scissors 20 is provided which may be constructed in the same manner as that of the first shears 12. The shears 20 are actuated via a toggle lever 21 by an electric solenoid 22 which is tiltably fastened to a pillow or bearing block 23. The pillow block 23 is connected via a bracket 24 to a rocker arm 25 which is attached at 26 to the support frame 17. Below the rocker arm 25, there is mounted a tilting or pivot tube 30 which serves as a switch and can be moved for this purpose, by means of an electric drive 31, out of one end position thereof shown by solid lines into the other end position thereof which is shown by broken lines 32. The pivot tube 30 is supported at a pivot point below which the pivot tube is provided with a tubular jacket 34 which can be moved by a spindle 35. Above the pivot point 33 a telescopic tube 36 is provided having an end piece 37 which can be driven or extended up to the shears 12 after the arm 25 has been swung out of the way.

Below the drive 31, an arm 40 guided by a ball joint is mounted in the support frame 17. It serves for lifting and tilting or pivoting a plug 41, by which a bore 42 formed in a funnel-like cover 43 of the storage container 5 can be closed.

On the support frame 17, a mast 45 is supported as a telescoping guide tube in a ball joint 46 and is additionally braced by struts 47 of adjustable length. The upper tube 48 of the telescope carries, at the end thereof facing away from the shears 12, 20, a drive device 50 with friction wheels 51 which can be set in motion by a drive not otherwise shown in detail. On the drive device 50, there is further arranged a cable entry tube 53 which ends in a funnel 54. The tube 48 is adjustable by means of a toothed rack 55 which can be set in motion by a crank 57 via a telescope drive 56. At the lower end of the mast 45, a sensor 60 and a stop 61 post-connected thereto is attached below the joint 46. The sensor 60 detects the arrival of a probe which is to be removed, the probe being pushed by the drive unit 50 into the mast 45. It operates, for example, as an inductive transmitter, as an ultrasonic sensor or the like and switches the drive motor of the drive unit 50 off if the sensor 60 is reached Thereafter, the probe to be removed can be guided farther along by hand or by manual control of the drive device 50 by means of the local control station 62, until a second drive device 63 is reached. The latter is likewise equipped with friction wheels 64. The otherwise nonillustrated drive motor thereof is controlled as a function of the torque, however.

A radiation detector 65 is provided between the stop 61 and the second drive device 63. It has a sensitivity in the range of 10. to 10⁴ rem/h and controls the electric drive 31 for the tilting or pivoting tube 30 and the scissors 12 and 20, as a function of a limit value, in the following manner:

The probes which includes, for example, a detector 100 mm long and measuring line 15 m long which are withdrawn from the otherwise nonillustrated nuclear reactor, are cut below the limit value into sections about 600 mm long, by means of the shears 20. In the position of the tilting or pivot tube 30 shown in solid lines, these sections or pieces are filled into a shroud or quiver 68 which is placed in a holder 69 or the storage container 5 and required no special shielding.

If the radiation detector 65 measures a higher activity, however, the cutting process is stopped. The heretofore operating shears 20 are rendered inoperative by bringing them out of the operating position thereof by means of the tilting or pivot arm 25. In addition, the tilting or pivot tube 30 is transferred into the position thereof shown in broken lines 32, and wherein the jacket tube 34 is run downwardly so far that it projects into the opening 42. The further sections of the probe with stronger radiation are then cut by the shears 12 into sections which are 20 to 30 mm long and fill the interior 6 of the container 5 well. The shorter severing length can be obtained by reducing the feed velocity or by increasing the cycle frequency of the shears.

The second part of the cutting operation is continued until the detector with the larger diameter reaches the stop 61 after the measuring lines have run through. From the stopping of the detector, a known residual length is obtained which is cut up by the upper shears 12 in such a manner that the last cut does not go through the detector. The latter is, on the contrary, delivered in its entirety into the storage container 5. the control panel with push buttons 71 which is arranged on the support frame 17 as the local control station 62 can serve for controlling all electrical functions of the device. However, the device can also be operated by remote control from an otherwise nonillustrated control console.

In FIG. 2, there is indicated that the base plate 10 with the support frame 17, on which the mast 45 is supported, is firmly braced or tightened by tie rods 72 at stop eyes 73 of the storage container 5. The stop eyes 73 serve for transporting the container 5 to ultimate storage after it has been filled. Thus, the device can readily be disassembled and transported. In particular, the mobility in tight spaces under a reactor pressure vessel is considerably improved by removing the mast 45 which is detachable mounted on the support frame 17.

The foregoing is a description corresponding, in substance, to German application P 33 01 814.6, dated Jan. 20, 1983, international priority of which is being claimed for the instant application, and which is hereby made part of this application. Any material discrepancies between the foregoimng specification and the specification of the aforementioned corresponding German application are to be resolved in favor of the latter.

There are claimed:

1. Device for disposing of elongated core instrumentation probes from nuclear reactors, the device having a guide for the probes to be disposed of, shears for cutting the elongated probes into sections, and a shroud for receiving the sections, the device comprising a shielded storage container, the guide being formed as a telescopic tube and including a switch for bypassing the shroud, means for controlling said switch together with the shears for directing relatively long probe sections having a relatively low radiation level into the shroud, and for cutting probe parts having a relatively high radiation level into manifold shorter sections and guiding the manifold shorter sections of the probes having the relatively high radiation level into said shielded storage container, drive means located at least at one end of said telescopic tube, a movable transport frame carrying said shielded storage container, the shroud being carried, in turn, by said shielded storage container, and a plate mounted on said storage container and carrying said drive means, the shears and said switch, said plate having a support frame whereon the shears and said switch are supported, and said telescopic tube being releasably fastened to said support frame.

2. Device according to claim 1 wherein said controlling means comprise a radiation-measuring device.

3. Device according to claim 1 wherein said shears are two in number and are alternatingly operative.

4. Device according to claim 1 wherein the lengths of the relatively long probe sections, on the one hand, and the manifold shorter probe sections, on the other hand, differ by at least a factor of 10.

5. Device according to claim 1 wherein said drive means are located at both ends of said telescopic tube.

6. Device according to claim 5 wherein one of one ends of said telescopic tube faces towards said shears, the drive means located at said one end being torque-controlled.

7. Device according to claim 6 wherein the other drive means located at the other end of said telescopic tube is connected to a transmitter located at said one end of said telescopic tube facing towards said shears.

* * * * *